(12) United States Patent
Manning (10) Patent No.: US 10,543,589 B2
(45) Date of Patent: Jan. 28, 2020

(54) METHOD FOR INSTALLING A GASKET INTO A JOINT BETWEEN TWO PIPES

(71) Applicant: John Manning, Abington, MA (US)

(72) Inventor: John Manning, Abington, MA (US)

(73) Assignee: MJ-Hammer, LLC, Austin, TX (US)

( * ) Notice: Subject to any disclaimer, the term of this patent is extended or adjusted under 35 U.S.C. 154(b) by 80 days.

(21) Appl. No.: 15/708,752

(22) Filed: Sep. 19, 2017

(65) Prior Publication Data

US 2018/0079060 A1 Mar. 22, 2018

Related U.S. Application Data

(60) Provisional application No. 62/396,581, filed on Sep. 19, 2016.

(51) Int. Cl.
| | |
|---|---|
| *B25B 27/00* | (2006.01) |
| *B25D 1/14* | (2006.01) |
| *B23P 11/02* | (2006.01) |
| *B21D 39/04* | (2006.01) |
| *B25D 1/00* | (2006.01) |

(52) U.S. Cl.
CPC .......... *B25B 27/0092* (2013.01); *B21D 39/04* (2013.01); *B23P 11/02* (2013.01); *B25B 27/0028* (2013.01); *B25D 1/00* (2013.01); *B25D 1/14* (2013.01); *Y10T 29/49872* (2015.01)

(58) Field of Classification Search
CPC ... B25B 27/0092; B25B 27/0028; B25D 1/14; B25D 1/00; Y10T 29/49872; B21D 39/04; B23P 11/02
See application file for complete search history.

(56) References Cited

U.S. PATENT DOCUMENTS

| | | | | |
|---|---|---|---|---|
| 1,822,394 | A | * 9/1931 | Ferguson | ................. B25D 1/00 72/477 |
| 3,712,284 | A | * 1/1973 | Porter | ...................... B25D 1/00 125/40 |
| 7,694,392 | B2 | * 4/2010 | Touchette | ................ B25D 1/14 16/430 |

* cited by examiner

*Primary Examiner* — Jermie E Cozart
(74) *Attorney, Agent, or Firm* — Pandiscio & Pandiscio (57) ABSTRACT

A hammer for installing a gasket into a joint between two pipes, the hammer comprising two opposed substantially rectangular, non-square strike surfaces which are rotationally offset from one another by 90 degrees such that an appropriate substantially rectangular, non-square strike surface may be selected by the user and applied to a gasket by simply rotating the hammer in the user's hands without requiring the user to relocate around the gasket.

9 Claims, 10 Drawing Sheets

METHOD FOR INSTALLING A GASKET INTO A JOINT BETWEEN TWO PIPES

REFERENCE TO PENDING PRIOR PATENT APPLICATION

This patent application claims benefit of prior U.S. Provisional Patent Application Ser. No. 62/396,581, filed Sep. 19, 2016 by John Manning for HAMMER FOR INSTALLING A GASKET, which patent application is hereby incorporated herein by reference.

FIELD OF THE INVENTION

This invention relates to hammers in general, and more particularly to a novel hammer for installing a gasket into a joint between two pipes.

BACKGROUND OF THE INVENTION

Figure 1:
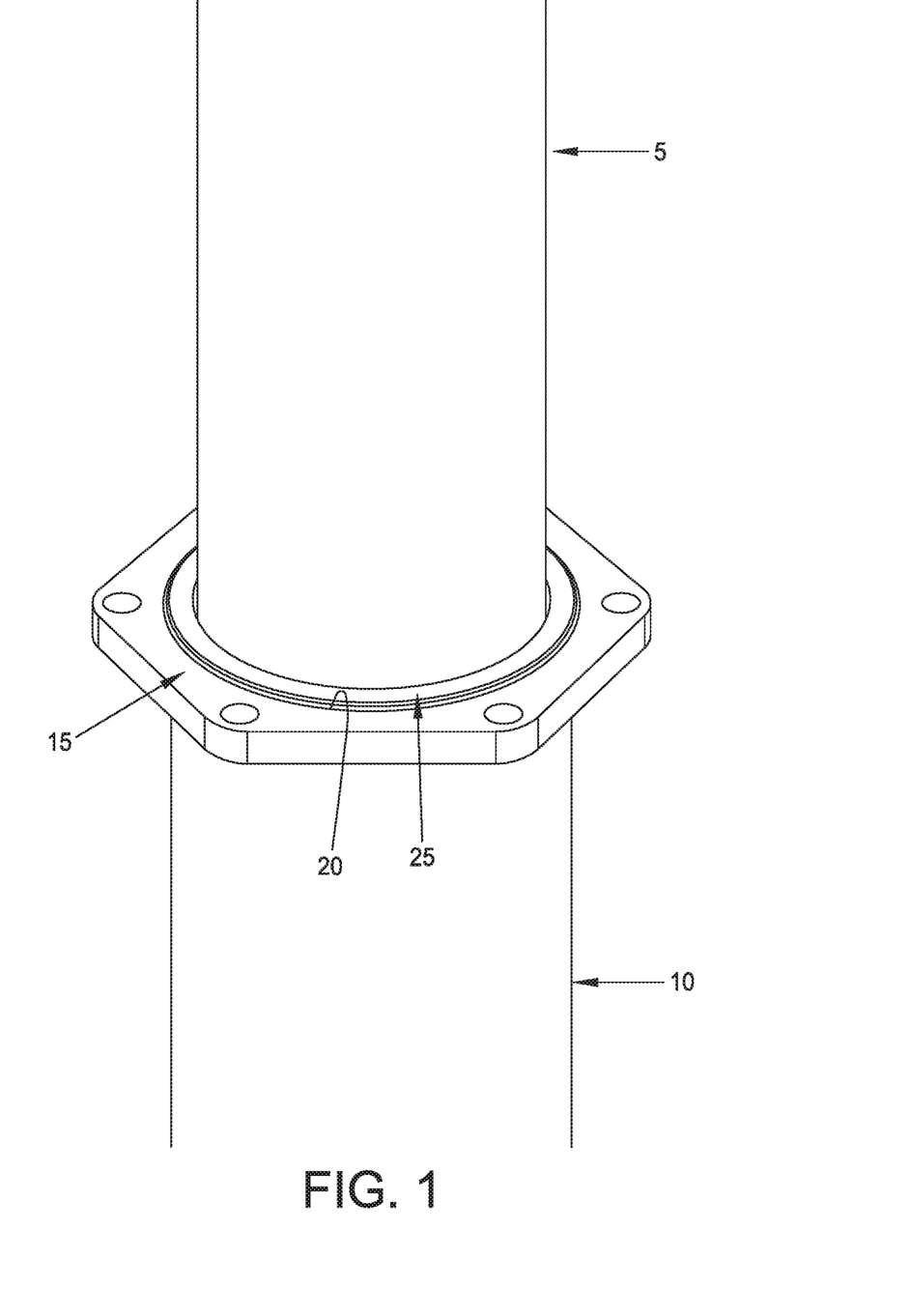
FIG. 1 is a schematic view of a gasket disposed in a gap between two pipes.

Large water, sewer and gas pipelines are typically made up of sections of pipe which are joined together at a joint. In order to fluidically seal the joint, a large rubber gland or "gasket" is typically installed at the joint between two pipes. See, for example, FIG. 1 which shows two pipes 5, 10 meeting at a joint 15. Joint 15 is typically characterized by a gap 20 between the two pipes. A gasket 25 is disposed in gap 20 so as to fluidically seal joint 15. By way of example but not limitation, in the plumbing industry, this type of joint is sometimes referred to as a "mechanical joint".

Gasket 25 is typically installed into gap 20, between pipes 5, 10, by striking the gasket with a hammer so as to drive the gasket into the gap between the two pipes and thereby fluidically seal the gap between the two pipes. It will be appreciated that, to this end, it is desirable to strike the gasket with a blunt hammer surface, as opposed to striking the gasket with a "pointed" hammer surface (such as that found on brick and claw hammers) since it is important not to damage the gasket during gasket installation. In this respect it will be appreciated that such brick and claw hammers are commonly found at construction sites but their use for installing pipe gaskets is strongly discouraged (and in some cases prohibited) by pipe installation inspectors. It will also be appreciated that, when installing a gasket into the joint between two pipes, it is desirable to strike only the gasket with the hammer, and to avoid striking an adjacent pipe, since this could damage the pipe.

It has been found that traditional ballpeen hammers lack sufficient mass to drive the gasket into the gap between the pipes.

It has also been found that traditional sledge hammers are too large for use in hammering gasket 25 into gap 20, i.e., they are too large to strike the gasket without also striking the adjacent pipe.

It should be appreciated that significant force is typically required to drive the gasket into the gap between the two pipes. Force is generated by a user swinging the hammer, however, the user requires space around the junction of the two pipes in order to swing the hammer and generate a sufficient force to drive the gasket into the gap between the two pipes. This can present a challenge where access to the gasket is limited, e.g., where the two pipes which are to be joined are located in a trench. Furthermore, it is often necessary to access all sides of the joint between the two pipes so as to ensure that the gasket is driven evenly and effectively into the gap between the two pipes. In order to reach all sides of the pipe joint, a user must typically reach over and/or around the joint in order to hammer the gasket into place. Thus, it can be difficult to effectively strike the gasket with the hammer, and/or to generate enough force with the hammer to drive the gasket into the gap between the two pipes, particularly where access to the gasket is limited.

Ideally, it is preferable to use a hammer comprising a substantially rectangular, non-square strike surface (i.e., a strike surface matching the radial thickness of the gasket) to hammer the gasket into place, since this allows maximum contact with the gasket without striking the adjacent pipe. However, when using a hammer having such a substantially rectangular, non-square strike surface, the user needs to be able to address the gasket "head on" (i.e., facing the radius of the pipe) such that the substantially rectangular, non-square strike surface of the hammer appropriately addresses the gasket. Unfortunately, this requires the user to "move around" the joint when installing the gasket so as to ensure that the substantially rectangular, non-square strike surface of the hammer always addresses the gasket "head on".

Thus there is a need for a new and improved hammer which is configured to deliver sufficient force to a gasket in order to install the gasket into the gap at a joint between two pipes. There is also a need for a new and improved hammer which allows a user to efficiently apply a substantially rectangular, non-square strike surface to the gasket without requiring that the user move around the joint between the two pipes so as to ensure that the substantially rectangular, non-square strike surface of the hammer always addresses the gasket "head on".

SUMMARY OF THE INVENTION

To this end, the present invention comprises a novel hammer having two opposed substantially rectangular, non-square strike surfaces which are rotationally offset from one another by 90 degrees such that an appropriate substantially rectangular, non-square strike surface may be selected by the user and applied to a gasket by simply rotating the hammer in the user's hands without requiring the user to relocate around the gasket.

In one form of the invention, there is provided a hammer for installing a gasket into a joint between two pipes, the hammer comprising two opposed substantially rectangular, non-square strike surfaces which are rotationally offset from one another by 90 degrees such that an appropriate substantially rectangular, non-square strike surface may be selected by the user and applied to a gasket by simply rotating the hammer in the user's hands without requiring the user to relocate around the gasket.

In another form of the invention, there is provided a hammer for installing a gasket into a joint between two pipes, the hammer comprising:

a handle; and a head comprising a first arm, a second arm and a neck, wherein the neck is aligned with, and extends away from, the handle, the first arm extends away from the longitudinal axis of the neck and the handle, and the second arm extends away from the longitudinal axis of the neck and the handle, with the second arm extending in the opposite direction to the first arm;

wherein the first arm comprises a body terminating in a first substantially rectangular, non-square strike surface, wherein the first substantially rectangular, non-square strike surface is defined by a first height dimension and a first width dimension, with the first width dimension being longer than the first height dimension, wherein the second arm comprises a body terminating in a second substantially rectangular, non-square strike surface, wherein the second substantially rectangular, non-square strike surface is defined by a second height dimension and a second width dimension, with the second height dimension being longer than the second width dimension.

In another form of the invention, there is provided a method for installing a gasket into a joint between two pipes, the method comprising:

providing a hammer for installing a gasket into a joint between two pipes, the hammer comprising:
a handle; and
a head comprising a first arm, a second arm and a neck, wherein the neck is aligned with, and extends away from, the handle, the first arm extends away from the longitudinal axis of the neck and the handle, and the second arm extends away from the longitudinal axis of the neck and the handle, with the second arm extending in the opposite direction to the first arm;
wherein the first arm comprises a body terminating in a first substantially rectangular, non-square strike surface, wherein the first substantially rectangular, non-square strike surface is defined by a first height dimension and a first width dimension, with the first width dimension being longer than the first height dimension,
wherein the second arm comprises a body terminating in a second substantially rectangular, non-square strike surface, wherein the second substantially rectangular, non-square strike surface is defined by a second height dimension and a second width dimension, with the second height dimension being longer than the second width dimension;
grasping the hammer so that one of the first substantially rectangular, non-square strike surface and the second substantially rectangular, non-square strike surface faces away from the user;
striking the gasket using that one of the first substantially rectangular, non-square strike surface and the second substantially rectangular, non-square strike surface;
rotating the hammer within the hand of the user so that the other one of the first substantially rectangular, non-square strike surface and the second substantially rectangular, non-square strike surface faces away from the user; and
striking the gasket using that other one of the first substantially rectangular, non-square strike surface and the second substantially rectangular, non-square strike surface.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

The present invention comprises the provision and use of a novel hammer having two opposed substantially rectangular, non-square strike surfaces which are rotationally offset from one another by 90 degrees, such that an appropriate substantially rectangular, non-square strike surface may be selected by the user and applied to a gasket by simply rotating the hammer in the user's hands without requiring the user to relocate around the gasket.

Figure 2:
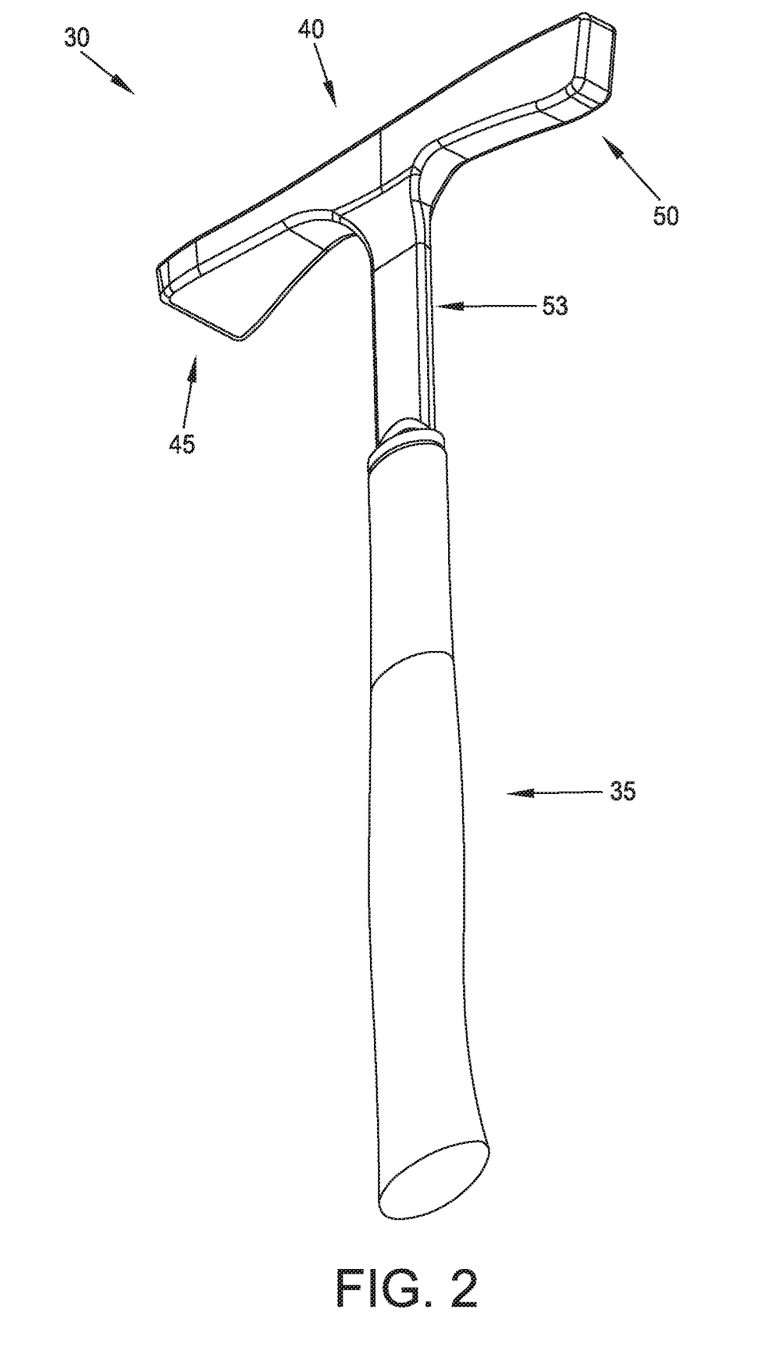
FIGS. 2-7 are schematic views showing a novel hammer formed in accordance with the present invention.
Figure 3:
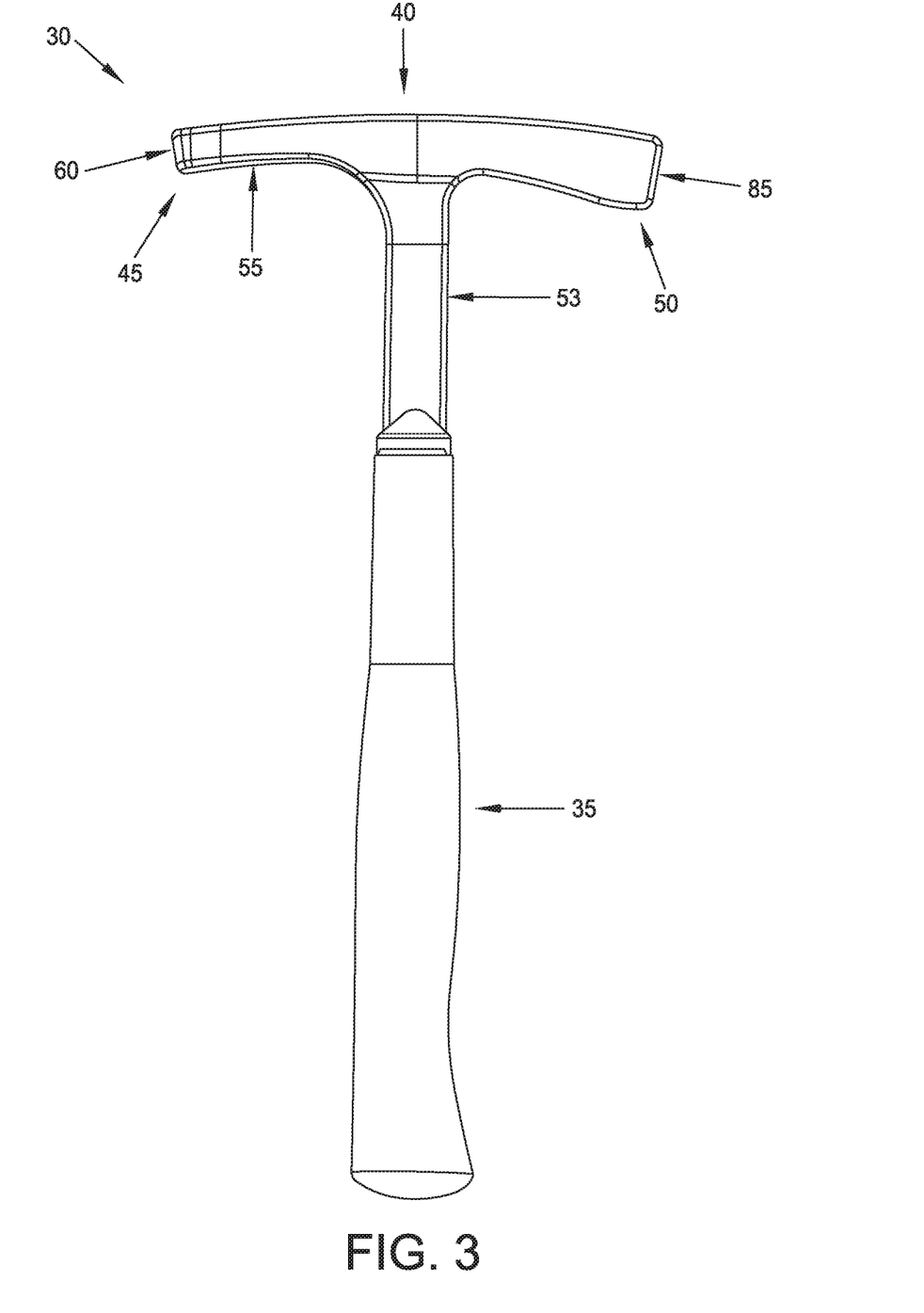

Looking first at FIGS. 2 and 3, there is shown a novel hammer 30 formed in accordance with the present invention. Novel hammer 30 generally comprises a handle 35 and a head 40 which extends away from one end of handle 35.

More particularly, head 40 generally comprises a first arm 45, a second arm 50 and a neck 53. Neck 53 is aligned with, and extends away from, handle 35. First arm 45 extends away from the longitudinal axis of neck 53 and handle 35, and second arm 50 extends away from the longitudinal axis of neck 53 and handle 35, with second arm 50 extending in the opposite direction to first arm 45. First arm 45 and second arm 50 are preferably of equal mass, such that the center of mass of hammer 30 is substantially aligned with the longitudinal axis of neck 53 and handle 35.

Figure 4:
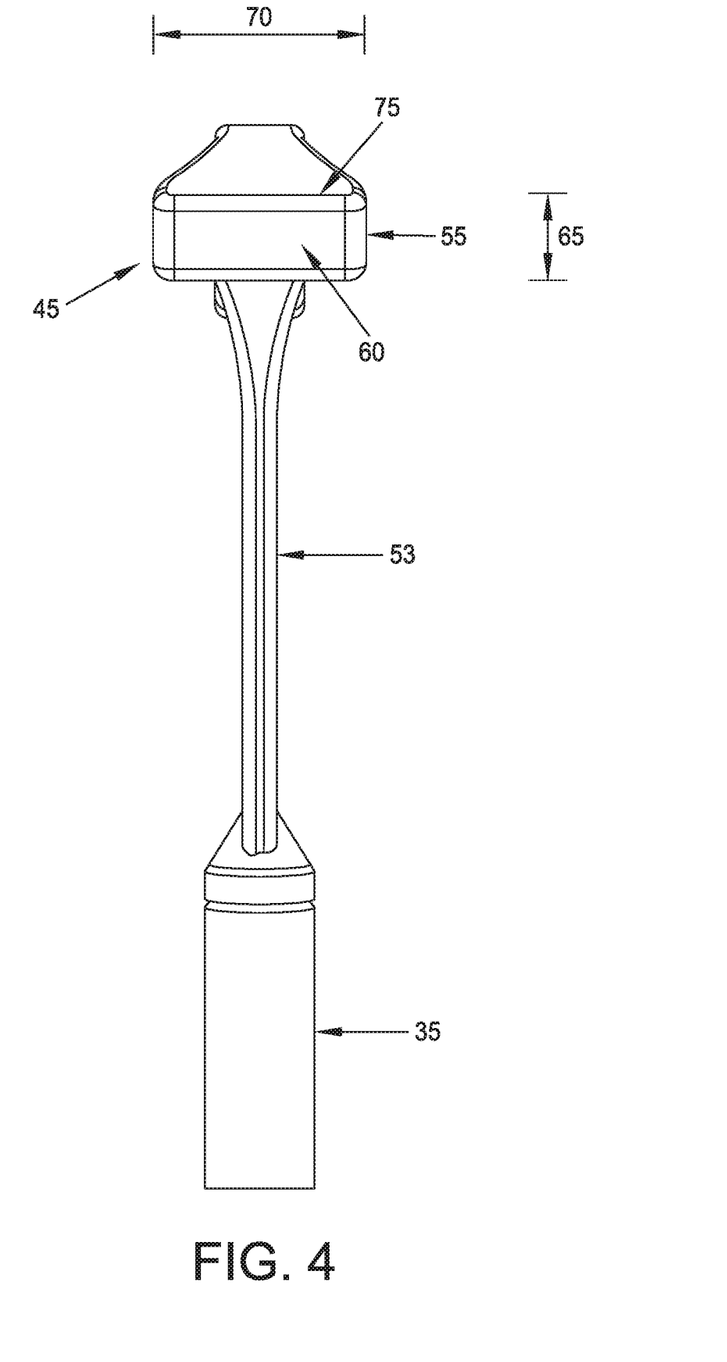
Figure 7:
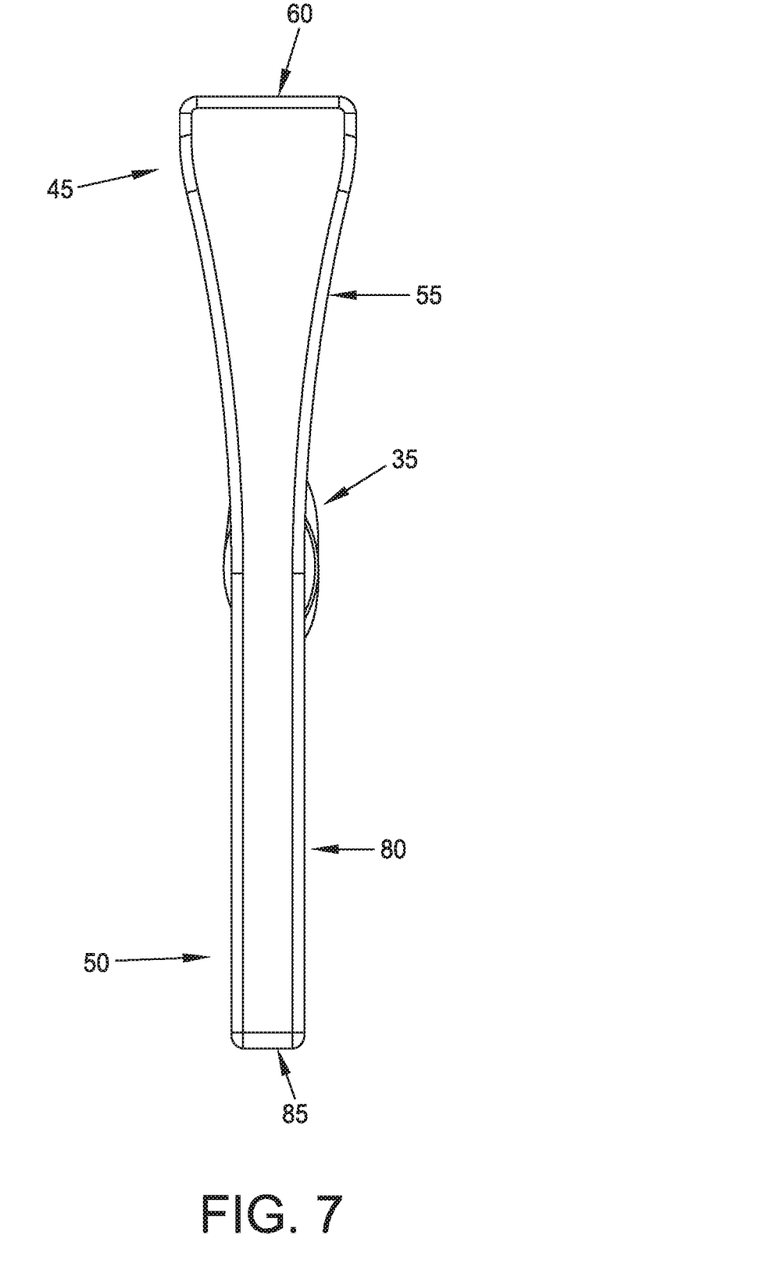

Looking next at FIGS. 3, 4 and 7, first arm 45 comprises a body 55 terminating in a substantially rectangular, non-square strike surface 60. Substantially rectangular, non-square strike surface 60 is defined by a height dimension 65 and a width dimension 70, with width dimension 70 being longer than height dimension 65. It will be appreciated that, in a preferred form of the present invention, substantially rectangular, non-square strike surface 60 is sized and configured so as to substantially match the configuration of a standard gasket when addressing the gasket "head on", e.g., height dimension 65 is substantially the same as the radial thickness of the gasket, and width dimension 70 is less than the curvature of gasket 25. As a result of this configuration, and as will hereinafter be discussed in greater detail, when the user is addressing the portion of the gasket to be hammered "head on", the user can use first arm 45 of hammer 30 to seat that portion of the gasket in the gap between the two pipes. The edges of substantially rectangular, non-square strike surface 60 are preferably radiused or chamfered at 75 so as to eliminate sharp edges which could damage a gasket.

Figure 5:
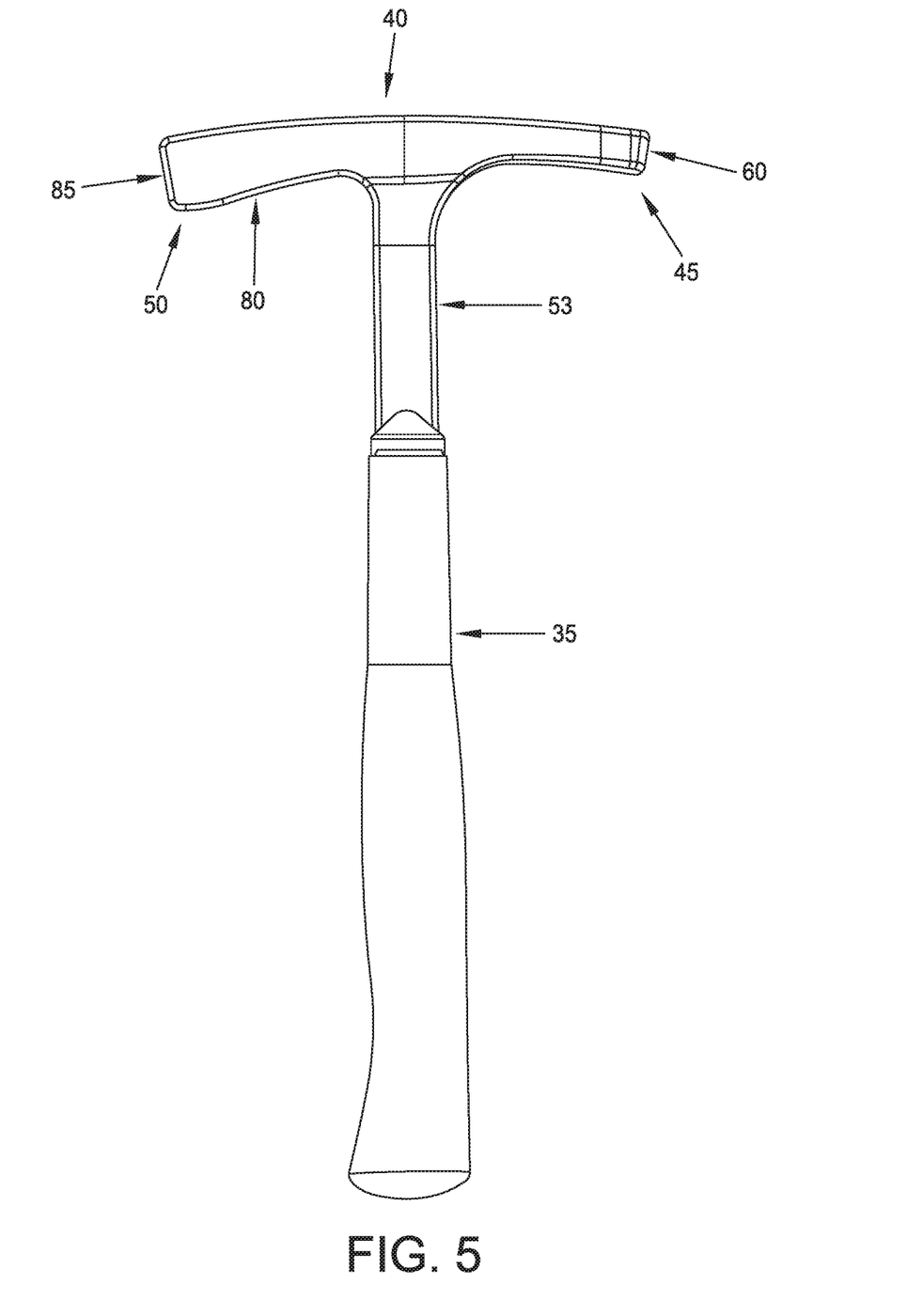
Figure 6:
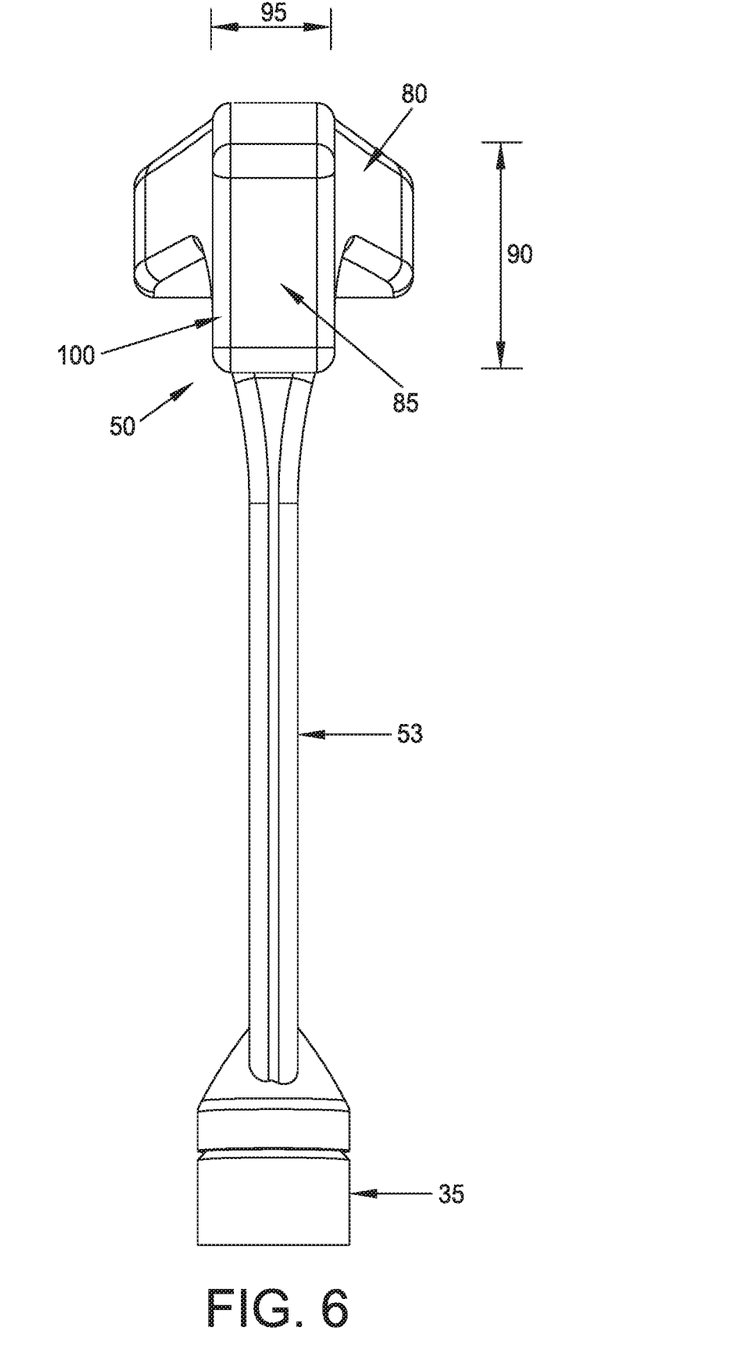

Looking next at FIGS. 5-7, second arm 50 comprises a body 80 terminating in a substantially rectangular, non-square strike surface 85. Substantially rectangular, non-square strike surface 85 is defined by a height dimension 90 and a width dimension 95, with width dimension 95 being shorter than height dimension 90. It will be appreciated that, in a preferred form of the present invention, substantially rectangular, non-square strike surface 85 is sized and configured so as to substantially match the configuration of a standard gasket when addressing the gasket "tangentially", e.g., width dimension 95 is substantially the same as the radial thickness of the gasket, and height dimension 90 is less than the curvature of gasket 25. As a result of this configuration, and as will hereinafter be discussed in greater detail, when the user is addressing the portion of the gasket to be hammered "tangentially", the user can use second arm 50 of hammer 30 to seat that portion of the gasket in the gap between the two pipes. The edges of substantially rectangular, non-square strike surface 85 are preferably radiused or chamfered at 100 so as to eliminate sharp edges which could damage a gasket.

It should be appreciated that substantially rectangular, non-square strike surface 60 and substantially rectangular, non-square strike surface 85 are opposed to one another, and rotationally offset from one another by 90 degrees, such that an appropriate substantially rectangular, non-square strike surface may be selected by the user and applied to a gasket by simply rotating the hammer in the user's hands without requiring the user to relocate around the gasket. Furthermore, it will be appreciated that first arm 45 and second arm 50 are sized and weighted such that hammer 30 has sufficient mass to deliver a desired force to a gasket when hammer 30 is swung by a user in a confined space, as will hereinafter be discussed.

In one preferred form of the invention, head 40 is hardened, polished or coated, etc. so as to keep substantially rectangular, non-square strike surfaces 60, 85 smooth throughout the life of hammer 30. By providing smooth substantially rectangular, non-square strike surfaces 60, 85, damage to a gasket can be minimized when hammer 30 is used to install a gasket.

It should also be appreciated that the radial thickness of "standard" gaskets are frequently constant, even for gaskets which are used when connecting pipes ranging from about 3 inches in diameter to about 36 inches or larger in diameter. Thus, novel hammer 30 can be used to install a gasket for a wide variety of pipeline installations.

If desired, handle 35 may be generally symmetrical, and handle 35 may comprise a tactile feature (e.g., a grip, molding, rubberized coating, etc.) to enhance gripping by the user and for minimizing vibration. Additionally, handle 35 may be brightly colored (e.g., fluorescent yellow, orange, green, etc.) so as to be easily locatable in dark or muddy work environments. Also, if desired, handle 35 may be elongated so as to provide the user with greater reach for accessing a gasket (e.g., where a pipe is located in a trench and the user is installing the gasket from outside the trench).

Exemplary Use of the Novel Hammer

Figure 8:
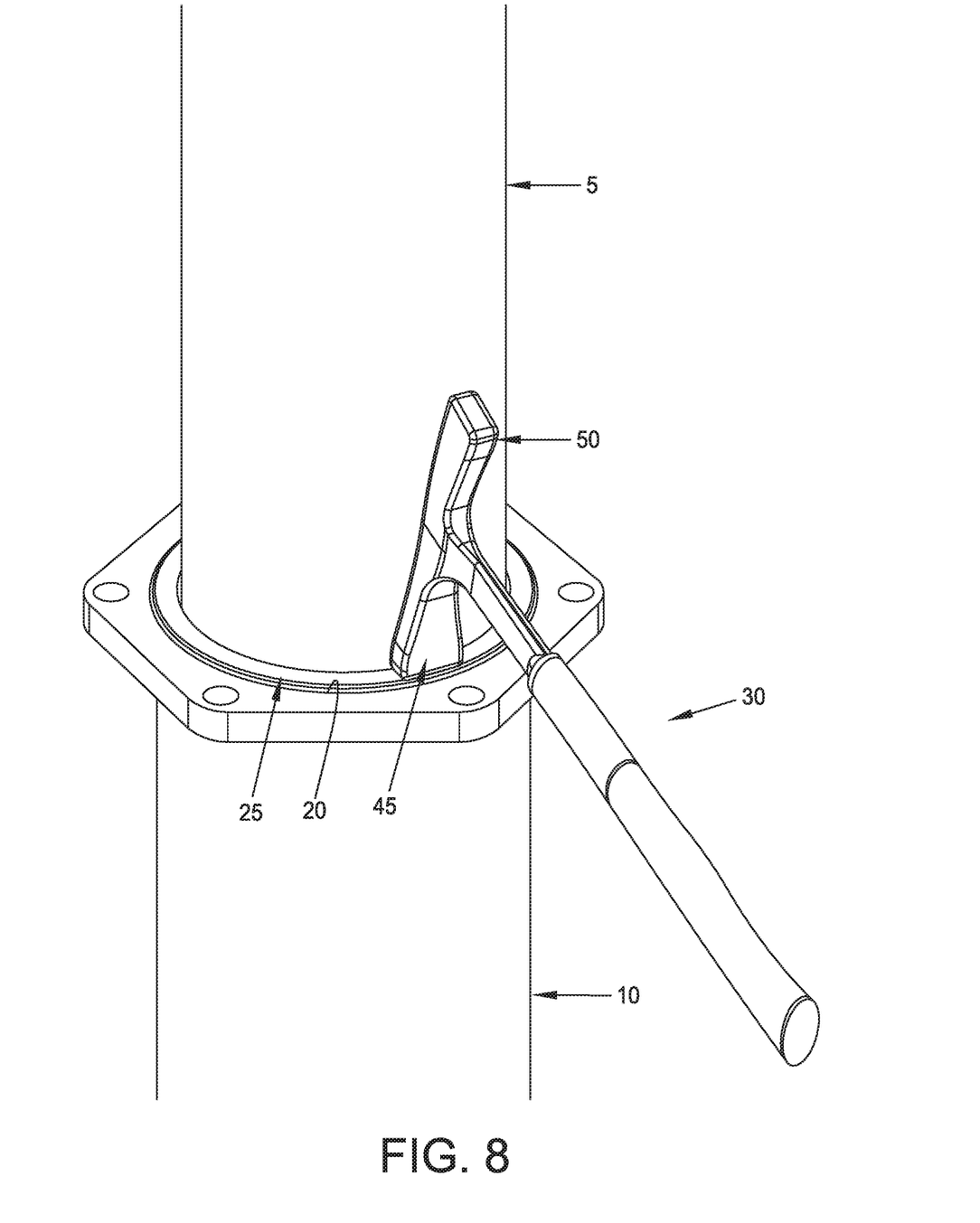
FIGS. 8 and 9 are schematic views showing the novel hammer of FIGS. 2-7 being used to install a gasket into the gap between two pipes so as to fluidically seal the joint between the two pipes.
Figure 9:
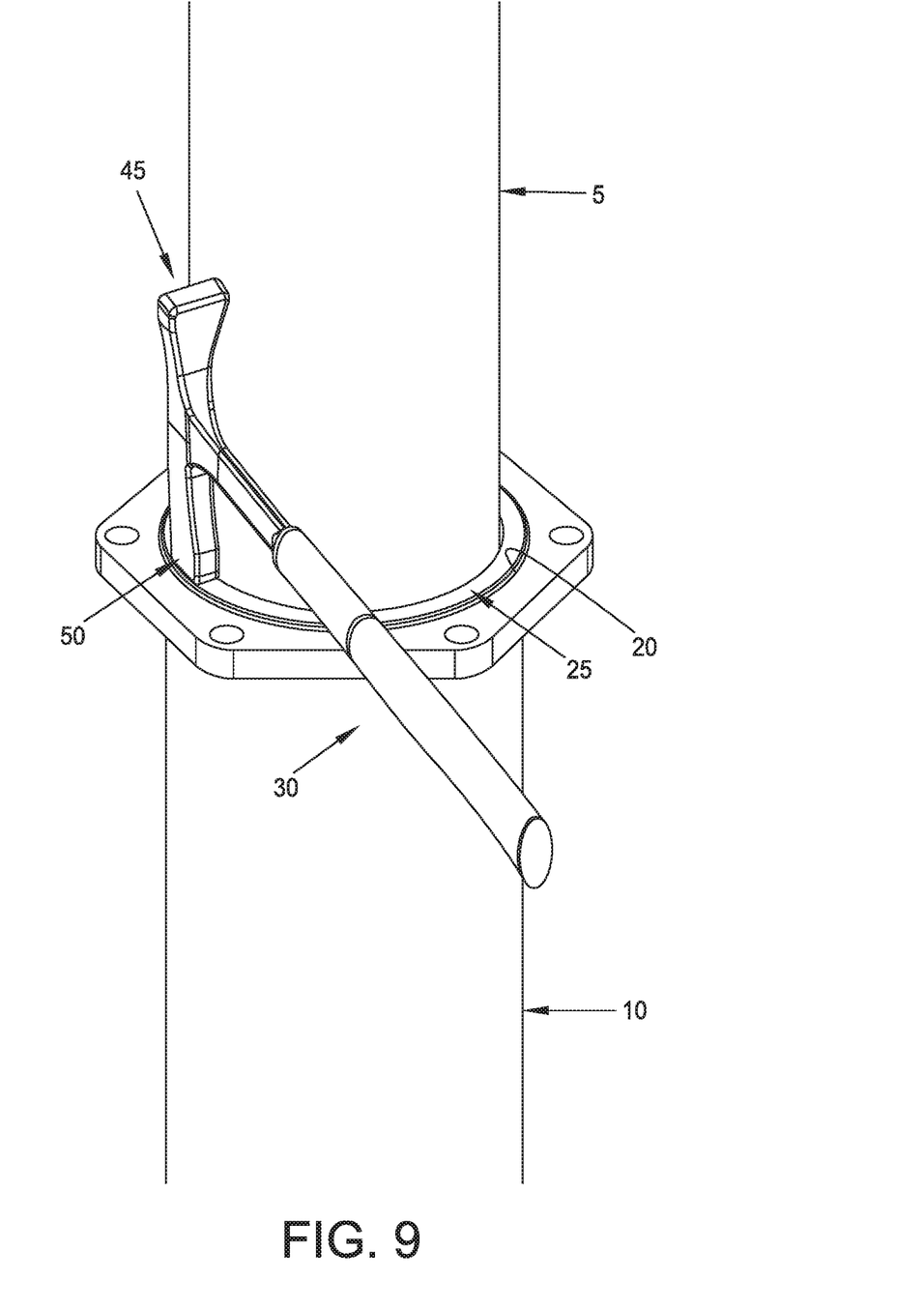

Looking now at FIGS. 8 and 9, hammer 30 is shown installing gasket 25 in gap 20 between pipe 5 and pipe 10.

More particularly, when the user is going to hammer the portion of gasket 25 which is disposed "head on" to the user (FIG. 8), so that the radial thickness of the gasket is presented to the user, the user orients hammer 30 so that first arm 45 addresses the gasket. The user then uses hammer 30 to hammer gasket 25 into place, with substantially rectangular, non-square strike surface 60 engaging the gasket in the manner shown in FIG. 8.

Correspondingly, when the user is going to hammer the portion of gasket 25 which is disposed "tangential" to the user (FIG. 9), so that the tangent of the gasket is presented to the user, the user orients hammer 30 so that second arm 50 addresses the gasket. The user then uses hammer 30 to hammer gasket 25 into place, with substantially rectangular, non-square strike surface 85 engaging the gasket in the manner shown in FIG. 9.

Thus it will be seen that, with the present invention, the user may select an appropriate substantially rectangular, non-square strike surface of the hammer for addressing a given portion of a gasket by simply rotating the hammer in the user's hand, without the user having to move relative to the gasket.

Fabrication of Hammer 30

Figure 10:
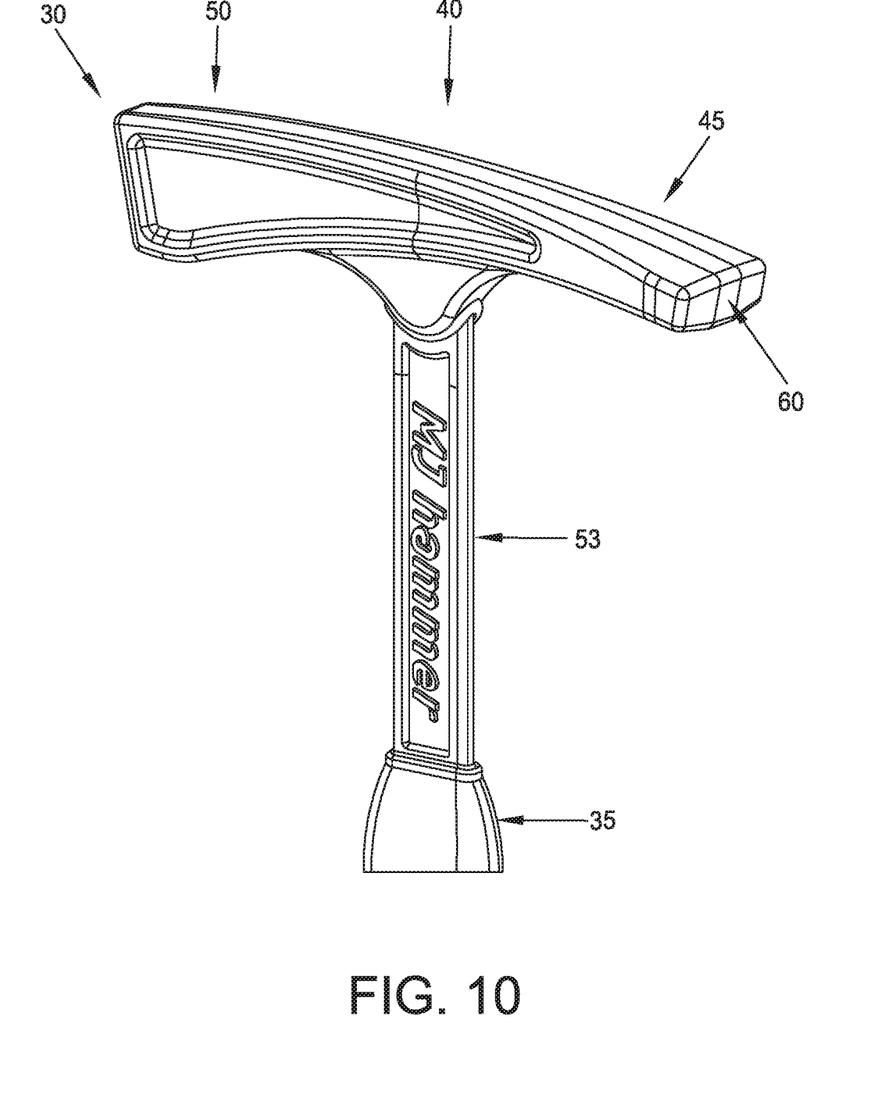
FIG. 10 is a schematic view showing another novel hammer formed in accordance with the present invention.

It will be appreciated that hammer 30 may be fabricated in a variety of ways without departing from the scope of the present invention. By way of example but not limitation, head 40 of hammer 30 may be cast (FIGS. 2-7), and then neck 53 of head 40 secured to handle 35. Alternatively, head 40 of hammer 30 may be forged (FIG. 10), and then neck 53 of head 40 secured to handle 35.

It is also possible for head 40 and handle 35 to be formed as a single, integral unit. By way of example but not limitation, head 40 and handle 35 may be cast (FIGS. 2-7) as a single, integral unit. Alternatively, head 40 and handle 35 may be forged (FIG. 10) as a single, integral unit.

Exemplary "Sizing" of Hammer 30

It is important the hammer 30 be properly "sized" for its intended use in installing a gasket into a joint between two pipes.

To this end, hammer 30 preferably has a "mass" (i.e., weight) of between about 1.0 pound and about 5.0 pounds.

And to this end, substantially rectangular, non-square strike surface 60 of first arm 45 of hammer 30 preferably has a height dimension 65 of between about ¼ inch and about 1.0 inch and a width dimension 70 of between about 1.0 inch and about 4.0 inches, and substantially rectangular, non-square strike surface 85 of hammer 30 preferably has a height dimension 90 of between about 1.0 inch and about 4.0 inches and a width dimension 95 of between about ¼ inch and about 1.0 inch.

MODIFICATIONS OF THE PREFERRED EMBODIMENTS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A method for installing a gasket into a joint between two pipes, the method comprising:
    providing a hammer for installing a gasket into a joint between two pipes, the hammer comprising:
        a handle; and
        a head comprising a first arm, a second arm and a neck, wherein the neck is aligned with, and extends away from, the handle, the first arm extends away from the longitudinal axis of the neck and the handle, and the second arm extends away from the longitudinal axis of the neck and the handle, with the second arm extending in the opposite direction to the first arm;
        wherein the first arm comprises a body terminating in a first substantially rectangular, non-square strike surface, wherein the first substantially rectangular, non-square strike surface is defined by a first height dimension and a first width dimension, with the first width dimension being longer than the first height dimension,
        wherein the second arm comprises a body terminating in a second substantially rectangular, non-square strike surface, wherein the second substantially rectangular, rectangular, non-square strike surface is defined by a second height dimension and a second width dimension, with the second height dimension being longer than the second width dimension;

grasping the hammer so that one of the first substantially rectangular, non-square strike surface and the second substantially rectangular, non-square strike surface faces away from the user;

striking the gasket using that one of the first substantially rectangular, non-square strike surface and the second substantially rectangular, non-square strike surface;

rotating the hammer within the hand of the user so that the other one of the first substantially rectangular, non-square strike surface and the second substantially rectangular, non-square strike surface faces away from the user; and striking the gasket using that other one of the first substantially rectangular, non-square strike surface and the second substantially rectangular, non-square strike surface.

2. A method according to claim 1 wherein the first arm and the second arm are preferably of equal mass, such that the center of mass of the hammer is substantially aligned with the longitudinal axis of the neck and the handle.

3. A method according to claim 1 wherein the first height dimension of the first arm is substantially equal to the second width dimension of the second arm, and wherein the first width dimension of the first arm is substantially equal to the second height dimension of the second arm.

4. A method according to claim 1 wherein the first substantially rectangular, non-square strike surface is sized and configured so as to substantially match the configuration of a standard gasket when addressing the gasket "head on", and wherein the second substantially rectangular, non-square strike surface is sized and configured so as to substantially match the configuration of a standard gasket when addressing the gasket "tangentially".

5. A method according to claim 4 wherein the first height dimension of the first substantially rectangular, non-square strike surface, and the second width dimension of the second substantially rectangular, non-square strike surface, is substantially the same as the radial thickness of a standard gasket.

6. A method according to claim 4 wherein the first width dimension of the first substantially rectangular, non-square strike surface, and the second height dimension of the second substantially rectangular, non-square strike surface, is less than the curvature of a standard gasket.

7. A method according to claim 1 wherein the edges of the first substantially rectangular, non-square strike surface are radiused or chamfered and wherein the edges of the second substantially rectangular, non-square strike surface are radiused or chamfered.

8. A method according to claim 1 wherein the hammer has a mass of between about 1.0 pound and about 5.0 pounds.

9. A method according to claim 1 wherein the first substantially rectangular, non-square strike surface has a first height dimension of between about ¼ inch and about 1.0 inch and a first width dimension of between about 1.0 inch and about 4.0 inches, and the second substantially rectangular, non-square strike surface has a second height dimension of between about 1.0 inch and about 4.0 inches and a second width dimension of between about ¼ inch and about 1.0 inch.

* * * * *